(12) United States Patent
Tassakos et al.

(10) Patent No.: US 6,618,496 B1
(45) Date of Patent: Sep. 9, 2003

(54) DEVICE FOR DETERMINING THE POSITION OF MEASURING POINTS OF A MEASUREMENT OBJECT RELATIVE TO A REFERENCE SYSTEM

(75) Inventors: Charalambos Tassakos, Drischerstrasse 66, D-52146 Würselen (DE); Efstratios Karaivazoglou, Tübingen (DE)

(73) Assignee: Charalambos Tassakos, Wuerselen (DE)

( * ) Notice: Subject to any disclaimer, the term of this patent is extended or adjusted under 35 U.S.C. 154(b) by 0 days.

(21) Appl. No.: 09/553,767

(22) Filed: Apr. 21, 2000

(30) Foreign Application Priority Data

Oct. 18, 1999 (DE) ...................... 299 18 341 U

(51) Int. Cl.⁷ ................................. G06K 9/00
(52) U.S. Cl. ........................ 382/154; 382/152
(58) Field of Search ................. 382/141, 154, 382/153, 152, 151; 348/86, 92, 94, 95, 125; 356/237, 12; 250/558, 561, 562; 700/195

(56) References Cited

U.S. PATENT DOCUMENTS 5,528,505 A * 6/1996 Granger et al. ............. 700/195
6,175,647 B1 * 1/2001 Schick et al. ............... 382/154

* cited by examiner

*Primary Examiner*—Samir Ahmed
*Assistant Examiner*—Vikkram Bali
(74) *Attorney, Agent, or Firm*—Paul Vincent

(57) ABSTRACT

A device for position determination of measuring points of a measuring object comprises a measuring means for determining the position of the measuring points relative to the position of the measuring means and a reference measuring means for determining the position of the measuring means relative to a reference system. The reference measuring means comprises a measuring arm or a robot arm, the proximal end of which is fixed with respect to the reference system, and the measuring means comprises an optical sensor means disposed at the distal end of the measuring arm or robot arm. The optical sensor means comprises at least two single or multiple image sensors which record images of at least part of the measuring object. A processing means determines the position of the measuring points of the measuring object from the recorded images. The processing of the recorded images is effected at least as rapidly as the recording frequency of the single and multiple image sensors, in real time (real time processing).

18 Claims, 2 Drawing Sheets

DEVICE FOR DETERMINING THE POSITION OF MEASURING POINTS OF A MEASUREMENT OBJECT RELATIVE TO A REFERENCE SYSTEM

This application claims Paris Convention priority of DE 299 18 341 filed Oct. 18, 1999 the complete disclosure of which is hereby incorporated by reference.

BACKGROUND OF THE INVENTION

The present invention concerns a device for determining the position of measuring points of a measuring object, comprising a measuring means for determining the position of the measuring points relative to the position of the measuring means, and a reference measuring means for determining the position of the measuring means relative to a reference system.

A device of this kind is disclosed in DE 197 21 903 C1. In the device disclosed therein, the measuring means is formed as a probe with a probe tip. The measuring points of a measuring object are measured by touching the individual measuring points, one after the other, with the probe tip. The position of the probe in a reference system is determined by a reference measuring means rigidly connected to the probe.

The reference measuring means comprises three electronic cameras displaced from one another which detect special measuring symbols in the reference system. The position of the probe tip in the reference system is determined photogrammetrically from the position of the measuring symbols. The conventional device can thereby determine the position of the probe tip and therefore the position of a measuring point relative to the reference system. This can be done, in particular, online, wherein the signal values of the cameras for each measuring point are passed on to a processing means, in which the positions of the measuring points are determined.

If the shape and the position (position and orientation) of at least part of a measuring object is to be determined in three-dimensional space, the conventional device has to detect the position of at least six measuring points of the measuring object, one after the other. If e.g. the shape and position of a circular depression in the measuring object has to be measured, the probe tip must be initially positioned to at least three different measuring points, one after another, from the inside to the edge of the depression for determining the shape of the depression, and the positions of the measuring points must be determined by the processing means. For determining the position of the depress ion in three-dimensional space, the probe tip is subsequently disposed at at least three different measuring points, one after another, outside of the depression on a surface of the measuring object and the positions of the measuring points are again determined. It is easy to imagine that measurement of the shape and position of complex patterns, in particular measuring object geometries which have polygonal substructures, is considerably more demanding.

The recording of a plurality of measuring points for determining the shape and position of an individual measuring object requires a substantial amount of time and work. In addition, the conventional method for determining the position of the measuring points of a measuring object is susceptible to errors generated when the probe tip does not properly seat at a measuring point. This may occur e.g. with poorly accessible measuring points or if determination of the position of the probe tip relative to the reference system is triggered, although the probe tip is still moving towards the measuring point or has already departed therefrom.

A further disadvantage is that the conventional device only allows measurement of measuring objects made from materials which do not yield when the probe tip is supported thereon. For this reason, it is not possible to measure measuring objects made from a flexible material, such as e.g. foamed material or rubber. Nor can patterns on flat surfaces of a measuring object be measured with the conventional device, since a lateral supporting surface for the probe tip is required to determine the shape of the structure (in the above-mentioned example e.g. the edge of the depression) which is not present on a flat surface. For this reason, the patterns disposed on a glass ceramic cooker for delimiting the individual cooking fields cannot be measured with the conventional device.

A further disadvantage of the conventional device is the excessively demanding design of the reference measuring system. At first, a target surface rigidly connected to the reference system must be provided, with the measuring symbols disposed thereon. The rigid connection between the target surface and the reference system must be maintained at all times and the measuring symbols must be disposed very precisely on the target surface, since otherwise the determination of the position of the measuring points would be erroneous. In addition, the photogrammetric method of the conventional device for determining the position of the probe tip from the detected measuring symbols (e.g. so-called inverse photogrammetry) is very demanding and requires an excessive amount of time and calculation.

It is therefore the underlying purpose of the present invention to facilitate, design, and develop a device of the above mentioned kind such that any measuring object, in particular comprising surfaces of any design and consisting of any material, can be measured.

SUMMARY OF THE INVENTION

In achieving this object in accordance with the invention and departing from the device of the above mentioned kind:
- the reference measuring means is a measuring arm or a robot arm, the proximal end of which is fixed relative to the reference system; and
- the measuring means is an optical sensor means disposed at the distal end of the measuring arm or robot arm;
- wherein the optical sensor means comprises at least two single or multiple image sensors recording images of at least part of the measuring object; and
- the device comprises a processing means which determines the position of the measuring points of the measuring object from the recorded images;
- wherein processing of the recorded images is carried out in real time with the recording frequency of the single or multiple image sensors (real time processing).

The device in accordance with the invention advantageously combines a highly accurate and high-speed optical sensor means of simple design with a measuring or robot arm of simple design and with easy handling. A device of simple construction which can measure any measuring object in a straight forward fashion, in particular one having surfaces of any design and consisting of any material, is thereby obtained.

The measuring arm comprises several elements pivotably attached to one another. The proximal end of the measuring arm is disposed in a reference system. The distal end of the measuring arm can be moved with several degrees of freedom. The measuring arm is usually moved manually by a user. The number of positions to which the measuring arm can be moved depends on the number of elements and the number and kind of joints between the elements. The measuring arm comprises sensors which detect a motion of the joints and are preferably disposed in the area of the joints. The sensor signals are guided to a processing means which uses the sensor signals to determine the position of the distal end of the measuring arm relative to the reference system. The measuring arms used for the present invention are sold e.g. by the company Faro, Lake Mary, Fla., USA (http://www.faro.com) under the name FaroArm.

Alternatively, a robot arm can be used instead of a measuring arm, which also comprises several jointed elements and is disposed with its proximal end in a reference system. The distal end of the robot arm can be moved with several degrees of freedom. Towards this end, the robot arm has a number of actuators which are controlled by the processing means such that the distal end of the robot arm assumes a predetermined position. The number of positions to which the robot arm can be moved depends on the number of elements and the number and kind of the joints between the elements. For determining the position of the distal end, the robot arm may have sensors which detect a motion of the joints and which are preferably disposed in the region of the joints. Alternatively, the desired values of the position of the distal end of the robot arm can be used instead of the actual values. The processing means knows the desired values, since it controls the robot arm therewith. Robots with robot arms for use in the present invention are e.g. known from the field of automobile manufacturing in various embodiments and from various manufacturers.

The distal end of the measuring arm or the robot arm has an optical sensor means for determining the position of measuring points of a measuring object relative to the position of the sensor means. The optical sensor means can detect the measuring points of the measuring object in various ways. It can operate with optical radiation of any wavelength. It can detect any particular measuring point individually or several points at the same time. A preferred embodiment of an optical sensor means which is particularly well suited for the inventive device is disclosed in DE 199 10 699.

The optical sensor means comprises at least two single or multiple image sensors. Images of at least part of the measuring object to be measured are recorded using single image sensors (e.g. cameras for recording static images) or multiple image sensors (e.g. cameras for recording dynamic images). The use of at least two single or multiple image sensors permits simple acquisition of measuring object images having larger information content. For recording the images, the single or multiple image sensors must not be disposed at certain positions relative to the measuring points of the measuring object to be measured. The measuring points must merely be contained in the images recorded by the single or multiple image sensors. The images can be recorded with the single or multiple image sensors within a very short time when appropriate hardware and software are used.

The processing means determines the positions of the measuring points of the measuring object from the images recorded by the single or multiple image sensors using suitable image processing methods. Processing of the recorded images keeps pace with the recording frequency of the single or multiple image sensors. Such processing is also referred to as real time processing. Real time processing has the advantage that the image sensors continuously record and evaluate images when the sensor means moves past the measuring object. The recording and processing of images can terminate as soon as the sensor means has measured a certain measuring object, i.e. has received and evaluated images therefrom. In this fashion, a search function can be realized which facilitates automated measurement of measuring objects using the inventive device.

As optical sensor means, single, or multiple image sensors can be used which record an image e.g. every 20 ms or 40 ms, transfer the recorded image to the processing means and store it therein to enable access to the recorded image at any time during further processing. The images recorded in the processing means are then processed in the subsequent processing cycle (20 ms or 40 ms later). The actual recording of the images is carried out more or less simultaneously for all image sensors of the sensor means and takes, in general, less than 2 ms, in particular, approximately 0.5 ms. Through the use of a light flash which emits flashes of light towards the measuring object of approximately 0.02 ms in duration (approximately $\frac{1}{100}$ of the recording time of the image sensors), the effective recording time can be reduced. Most of the 20 ms or 40 ms is required for reading the recorded images into the processing means.

For every recording of the position of one or more measuring points relative to the position of the optical sensor means by the sensor means, the measuring arm or the robot also determines the position of the sensor means relative to the reference system. From these two position values, the position of the measuring point(s) relative to the reference system can be determined. One can then determine the position of the measuring object or of part of the measuring object relative to the reference system by means of the position of the measuring points.

The device in accordance with the invention can also be operated by untrained staff, since particular measuring points of a measuring object must not be precisely approached to achieve sufficiently accurate measurement of the measuring object. It is sufficient to roughly approach the measuring points of the measuring object and include them in the recorded images. Towards this end, the hardware of the optical sensor means must be adjusted in such a manner that all measuring points of the measuring object to be detected can actually be detected by the sensor means, i.e. the single or multiple image sensors must be directed towards a predetermined measuring volume and that part of the measuring object to be measured has to be disposed in the measuring volume. Selection of the correct measuring points of a recorded measuring object and the determination of the position of the measuring points is then carried out by image processing software in the processing means.

The proposed optical sensor means having high speed processing enables determination of the position of measuring points of a measuring object using one measuring arm. In conventional measuring means, detection of the measuring points requires an excessive amount of time and use in a measuring arm is not practically feasible. A measuring arm guided by a user is always subject to inadvertent shaking by the user which falsifies determination of the position of the measuring points using conventional measuring means. The proposed optical sensor means requires such a short time (e.g. 2 ms, or 0.02 ms using a light flash) for recording images of the measuring object that inadvertent shaking by the user has no effect on the position determination.

After transport of a robot arm, residual vibrations are present at the distal end of the robot arm when the motion has ended. In conventional measuring means, these vibrations cause measuring errors in determination of the positions of the measuring points such that the determination of the position cannot be carried out before the vibrations have stopped. Through the use of the proposed optical sensor means, determination of the position can be advantageously started during these residual vibrations, since the optical sensor means requires such a short time for recording the images of the measuring object that vibrations have no effect on the determination of the position.

An advantageous further development of the present invention proposes that the processing means determines the position of the measuring points of the measuring object for each of the images recorded by the single or multiple image sensors, wherein the processing means comprises first means for filtering out the best positions of the measuring points. Filtering out of the best positions can be effected e.g. by averaging the positions determined on a measuring object and by eliminating those positions which excessively differ from the average value. Filtering out of the best positions can also be carried out using the standard deviation of the positions of the measuring points determined on a measuring object. In this manner, anomalous values can be filtered out of the measurements. The effects of inadvertent shaking of the measuring arm by a user or the effects of vibrations of the robot arm on the determination of the positions of the measuring points can be further reduced using the inventive device.

In a further advantageous embodiment of the present invention, the processing device comprises second means for determining the shape and also the position of at least one part of the measuring object relative to the position of the optical sensor means using the positions of the measuring points. By way of example, that part of a measuring object whose shape and position (position and orientation) is to be determined could e.g. be the colored borders of the cooking fields on a glass ceramic cooker, the proper positioning of which on the glass ceramic cooker is to be checked. A further typical application of the inventive device is measurement of the tread of a vehicle tire. A particularly preferred field of application is the vehicle industry, where the position (position and orientation) of a leaf member (car door, trunk or hood) relative to the vehicle chassis can be checked using the inventive device.

The second means of the processing means are advantageously designed such that they substantially simultaneously determine both the shape and the position of at least one part of the measuring object relative to the position of the optical sensor means. This has the advantage that a plurality of sequential separate measurements are not required for detecting the shape and the position. Instead, the corresponding measuring points for the measurements are detected substantially at the same time. Within the content of the present invention, "substantially at the same time" means that measurements of the shape and position of the measuring object are carried out rapidly, one after the other such that the measurements can be associated with the same value for the position of the sensor means relative to the reference system without loss of accuracy.

The single or multiple image sensors are preferably designed as electronic cameras, in particular CCD cameras. CCD cameras contain so-called CCD image converters comprising a plurality of semi-conductor components, disposed in the shape of a matrix, and functioning as photoelectric light receivers. The light receivers decompose the optical images projected by a camera lens, into single image elements with subsequent conversion into electric signals. The output signals of CCD cameras are already present in digital form and must not be digitized for further processing in the processing means.

In accordance with a preferred embodiment of the present invention, the single or multiple image sensors each record at least two images with two-dimensional information content of at least part of the measuring object and the processing means combines the two-dimensional images into at least one image having three-dimensional information content and evaluates the image to determine the shape and the position of the recorded part of the measuring object relative to the position of the optical sensor means. Each recorded two-dimensional image has associated values, recorded by the measuring arm or the robot arm, for the position of the sensor means relative to the reference system. The two two-dimensional images representing the same part of the measuring object are combined into an image having three-dimensional information content. This image must not be present in the form of a three-dimensional image on which the recorded measuring object is shown in a three-dimensional manner. Rather, the three-dimensional image can also simply be a mathematic model by means of which the shape and position of the recorded part of the measuring object is determined by the processing means.

In accordance with a preferred embodiment of the present invention, after being activated, the device continues to record images with the optical sensor means at the recording frequency and processes same in the processing means, wherein the processing means comprises third means for classifying the determined positions of the measuring points of the measuring object as valid or invalid depending on whether the determined positions are within or outside of a predetermined measuring volume of the optical sensor means.

In the inventive device in accordance with this embodiment, the optical sensor means is manually moved by a user on a measuring arm or moved on a robot arm by a robot towards the measuring object to be measured. After activation of the device, the single or multiple image sensors record images at a scanning frequency which are then processed by the processing means in real time. As long as the positions of the measuring points of the measuring object are outside of a predetermined measuring volume, the positions are classified as invalid and new images are recorded. As soon as the processing means detects that the positions of the measuring points are within the measuring volume, the positions are classified as valid. Determination of the positions can then be terminated or continued until a predetermined number of valid measurements of the same measuring object are obtained.

The device advantageously comprises signalling means for external communication of valid determination of positions of the measuring points of a measuring object. If a measuring arm is used as reference measuring means, the signalling means may be designed e.g. as display means (signal lamp or symbol on a screen) or acoustic means (signal tone) to inform the user of a valid position determination. If a robot arm is used as the reference measuring means, the signalling means can inform the robot in an appropriate fashion of a valid determination of measuring points. The user or the robot can then terminate the current position determination and e.g. move the optical sensor means into a rest position and deactivate the inventive device.

Alternatively, after completion of the position determination of the measuring points of a measuring object, the optical sensor means can be moved to a further measuring object where renewed position determination of measuring points of the further measuring object is carried out. Towards this end, an advantageous further development of the inventive device proposes that the processing means comprises a processing control in which several objects to be measured are determined in a defined sequence, wherein, after termination of position determination of the measuring points of a measuring object to be measured, processing control automatically changes to the next measuring object. Upon completion of position determination of the measuring points of the last measuring object to be measured, as defined by the processing control, processing control terminates the position determination and the inventive device is deactivated.

The single or multiple image sensors of the optical sensor means work in a predetermined measuring volume. The single or multiple image sensors have a defined resolution only within this measuring volume. The position of the measuring object can only be determined with the required accuracy when the measuring points of the measuring object are positioned within the measuring volume. Towards this end, the sensor means is positioned by the user or the robot at such a separation from the part of the measuring object to be measured that the measuring points to be recorded are located in the measuring volume.

A screen is connected to the optical sensor means for monitoring the measuring volume in two dimensions. The screen shows the output signals of the single or multiple image sensors, e.g. the field of view detected by the single or multiple image sensors. The optical sensor means at the distal end of the measuring arm or the robot arm is displaced until all measuring points of the measuring object to be recorded are visible on the screen. This facilitates positioning of the sensor means by the user or by the robot such that the measuring points of the measuring object lie, in two dimensions, within the measuring volume shown on the screen.

For monitoring the measuring volume in the third dimension perpendicular to the two dimensions shown on the screen, an advantageous further embodiment of the invention proposes that the optical sensor means comprises at least one laser for determining the separation between the optical sensor device and a surface of the measuring object using a laser beam. If the separation is also set to a defined value in the third dimension, a location of the measuring points within the measuring volume of the optical sensor means is ensured.

The separation between the sensor means and the surface of the measuring object can be measured in different ways. The invention suggests, in particular, that the optical sensor means comprises a laser for emitting a laser beam onto the surface of the measuring object, an optical sensor for receiving the laser beam reflected from the surface of the measuring object, and means for measuring the travel time of the laser beam from the laser to the optical sensor and for determining the separation between the optical sensor means and the surface of the measuring object from the travel time of the laser beam. The optical sensor is e.g. an area sensor. The detected separation between the sensor means and the surface of the measuring object is indicated to the user e.g. on the screen or on another display device or is transmitted to the processing means for controlling the robot. The user or the robot displaces the sensor means until it is located at a predetermined separation from the surface of the measuring object i.e. within the measuring volume.

Alternatively, the optical sensor means can have two lasers for emitting two laser beams towards the surface of the measuring object, wherein the laser beams extend in a common plane and cross one another at a common point of intersection disposed within the measuring volume of the optical sensor means. The separation between the images of the laser beams varies in dependence on the separation between the sensor means and the surface of the measuring object. When the sensor means is disposed at the predetermined separation from the surface, the two images of the laser beams coincide and only one single image is shown on the surface of the measuring object. The user can follow the laser beam images on the surface of the measuring object. The user can displace the sensor means until only one laser beam image is visible.

Monitoring of the separation between the two laser beam images can also be carried out automatically using an area sensor and not by the user. A preferred embodiment of the invention thereby proposes that the optical sensor means comprise an area sensor for recording the images of the two laser beams on the surface of the measuring object and means for measuring the separation between the images of the laser beams and for determining the separation between the optical sensor means and the surface of the measuring object from the separation of the images of the laser beams. Towards this end, the trigonometric relationships between the lasers and the area sensor must be known. The detected separation between the optical sensor means and the surface of the measuring object can be indicated to the user e.g. on a screen or other display means. Alternatively, the detected separation can be transmitted to the processing means which correspondingly displaces the sensor means at the distal end of the robot arm.

Using the above described devices, a user or a robot can easily move the optical sensor means to a position relative to the measuring points of the measuring object such that the measuring points are located in the measuring volume of the optical sensor means. This ensures exact position determination of the measuring points of the measuring object relative to the reference system.

The at least one area sensor can be at least one single or multiple image sensor, e.g. a CCD camera, for receiving the laser beam reflected from the surface of the measuring object or for receiving the images of the laser beams on the surface of the measuring object.

A preferred embodiment of the present invention is described below with reference to the drawings.

DESCRIPTION OF THE PREFERRED EMBODIMENT

Figure 1:
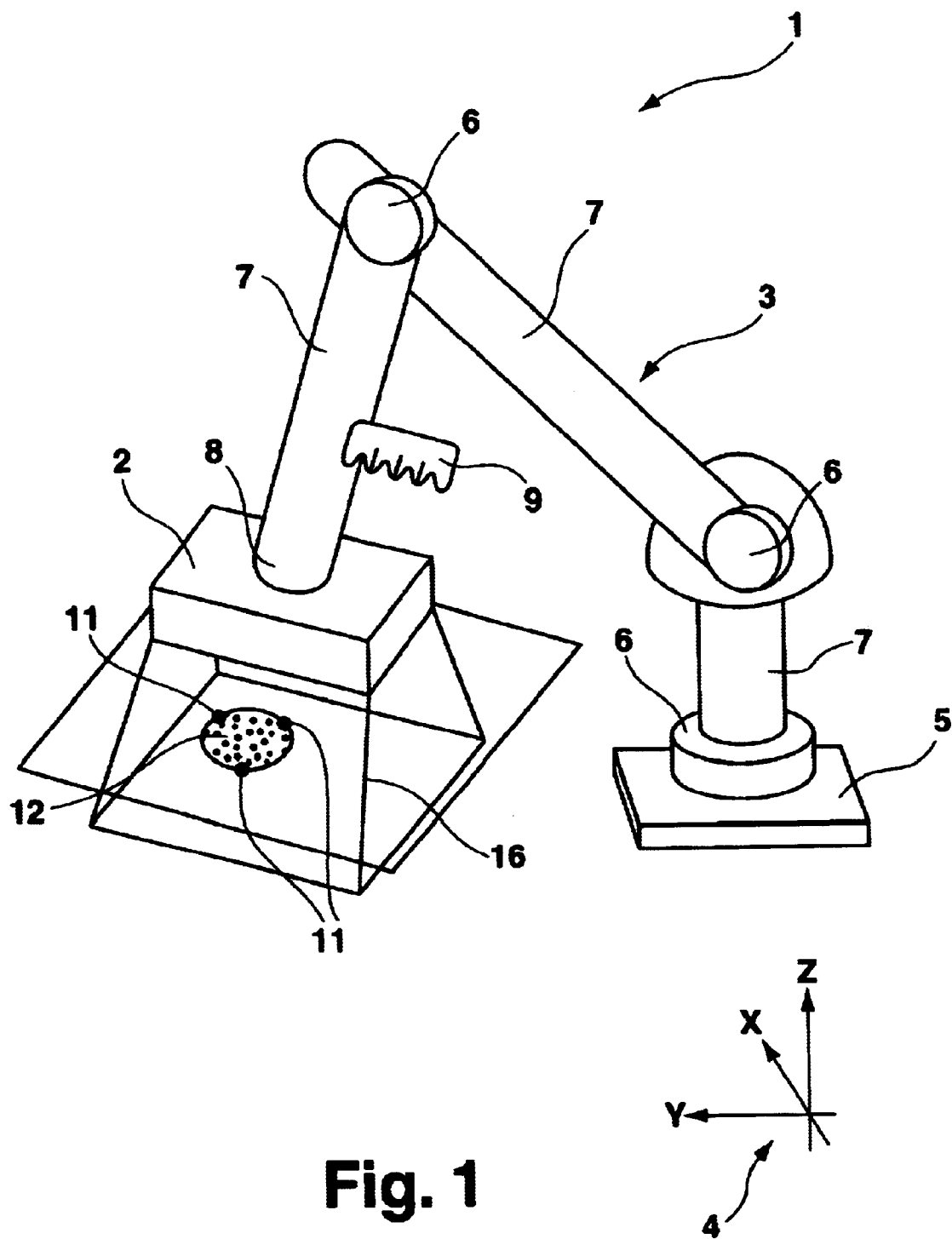
FIG. 1 shows an inventive device for determining the position of measuring points of a measuring object in accordance with a preferred embodiment.

FIG. 1 shows an inventive device for determining the position of measuring points of a measuring object, designated in its entirety with reference numeral 1. The device 1 comprises a measuring means constituting an optical sensor means 2 (schematically shown in FIG. 1) for detecting measuring points of the measuring object relative to the position of the sensor means 2. The device 1 also comprises a reference measuring means constituting a measuring arm 3 for determining the position of the sensor means 2 relative to a reference system 4.

The proximal end 5 of the measuring arm 3 is fixed with respect to the reference system 4. The measuring arm 3 comprises several elements 7, interconnected via joints 6. The joints 6 are e.g. swivel joints, ball and socket joints or rectilinear sliding pairs. The distal end 8 of the measuring arm 3 can be moved to several positions. The number of positions to which the measuring arm 3 can be moved depends on the number of elements 7 and the number and type of joints 6 between the elements 7. The measuring arm 3 comprises sensors (not shown) which detect motion of the joints 6. The sensor signals are fed to a processing means (not shown) which determines, from the sensor signals, the position of the distal end 8 of the measuring arm 3 relative to the reference system 4.

The measuring arm 3 is moved manually by a user (not shown). Towards this end, the user grasps a handle 9 of the measuring arm in the area of its distal end 8. The measuring arm 3 permits determination of the position of the distal end 8 of the measuring arm 3 relative to the reference system 4 in a simple, rapid, and highly accurate fashion, e.g. in the range of a few $1/100$ mm. Measuring arms 3 used for the present invention are sold e.g. by the company Faro, Lake Mary, Fla., USA (http://www.faro.com) under the name FaroArm.

The optical sensor means 2 is disposed at the distal end 8 of the measuring arm 3 (schematically shown in FIG. 1). A preferred optical sensor means 2 for use in the device 1 in accordance with the invention is described in DE 199 10 699. The sensor means 2 can determine the position of any measuring point 11 of a measuring object 12 relative to the position of the sensor means 2. The inventive device 11 permits determination of the position of the measuring points 11 of the measuring object 12 in the reference system 4 from the position of the optical sensor means 2 relative to the reference system 4 and from the position of the measuring points 11 relative to the position of the sensor means 2.

The inventive device 1 advantageously combines fast, precise optical sensor means 2 of simple construction with an easily handled measuring arm 3 of simple construction. The combination yields a device 1 of simple construction with which any measuring object 12, in particular, having surfaces of arbitrary design and made from an arbitrary material, can be measured.

Figure 2:
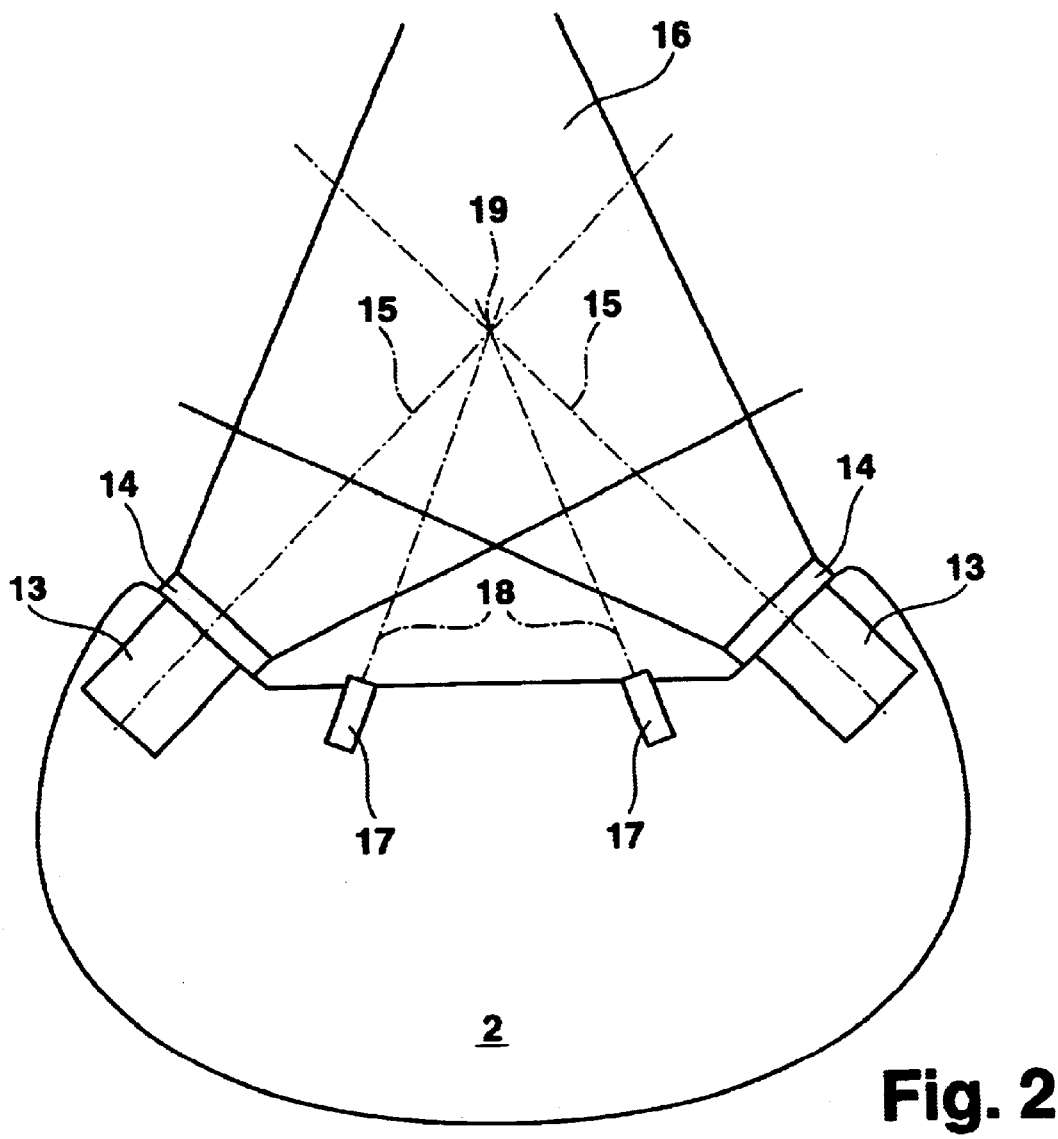
FIG. 2 shows a sectional top view of an optical sensor means of the device of FIG. 1.

FIG. 2 shows a top sectional view of a section of the sensor means 2 of the inventive device 1. The sensor means 2 comprises two single or multiple image sensors 13, preferably CCD cameras. To precisely define the optical properties of the sensors 13, optical elements 14, e.g. lenses are disposed in front of the openings of the sensors. The optical axes 15 of the two sensors 13 are offset with respect to one another and cross at a common point of intersection 19. Each of the sensors 13 records one or several images of the measuring object 12 with two-dimensional information content. The two-dimensional images are then combined to one or several images having three-dimensional information content. The position of a measuring point 11 in the three-dimensional space relative to the position of the sensor means 2 can be extracted from the three-dimensional image. The position of the measuring point 11 of the measuring object 12 relative to the reference system 4 can then be determined together with the value, measured by the measuring arm 37, of the position of the sensor means 2 relative to the reference system 4. The shape and position (position and alignment) of the measuring object 12 relative to the reference system 4 can be determined from the positions of several measuring points 11.

The point of intersection 19 of the optical axes 15 of the sensors 13 lies within a predetermined measuring volume 16 of the sensor means 2. The measuring volume 16 is indicated in FIG. 1 by a rectangle and in FIG. 2 by a circle. The measuring points 11 to be detected must lie within this measuring volume 16 to enable determination of the position of the measuring points 11 with sufficient accuracy.

The measuring object 12 in the present embodiment constitutes a circular pattern for characterizing the cooker fields of a flat glass ceramic cooker. Points at the outer edge of the circular pattern are selected as measuring points 11. Quality control comprises examination of whether or not the circular patterns 12 are disposed at the proper positions on the glass ceramic cooker.

The processing means comprises a processing control defining a predetermined sequence with which the measuring objects 12 are measured: in the present embodiment, the circular patterns of the various cooker fields of a glass ceramic cooker. At the beginning of a measuring cycle, the user approaches the first measuring object 12 of the processing control with the optical sensor means 2 such that the measuring object 12 to be measured lies within a predetermined measuring volume 16 of the optical sensor means 2. After activation of the device 1, each single or multiple image sensor 13 of the sensor means 2 records images at a certain recording frequency (e.g. every 40 ms). The recorded images are processed by the processing means in real time, i.e. processing is carried out in real time at the recording frequency. This rapid recording and processing of images of the measuring object 12 permits use of a measuring arm 3 as a reference measuring means without the shaking thereof caused by the user which is transferred to the measuring arm 3 and the optical sensor means 2 to cause measuring errors in the position determination.

The processing means classifies the positions of the measuring points 11 detected from the recorded images as invalid as long as they are outside of the measuring volume 16 of the sensor means 2. As soon as the optical sensor means 2 has been moved by the user into the region of the measuring object 12 and the measuring points 11 are within the measuring volume 16, the detected positions are classified as valid. A predetermined number of valid measurements is carried out. From the valid measurements, the best, i.e. the ones closest to an average value of the valid measurements or having minimum effect on the standard deviation, are selected and used for further processing. When a predetermined number of valid measurements has been carried out, an acoustical signal is issued to inform the user of termination of the position determination of the measuring points 11 for this measuring object 12. The processing control changes to the next measuring object and position determination for this measuring object is carried out in the same manner as for the measuring object 12. Immediately after measurement of the last measuring object defined by the processing control, the device 1 is deactivated, and recording and processing of images is terminated.

The inventive device 1 comprises auxiliary means for user positioning of the sensor means 2 such that the measuring points 11 are within the predetermined measuring volume 16. A screen (not shown) is connected to the sensor means 2 for monitoring the measuring volume 16 in two dimensions. The output signals of the single or multiple sensors 13 are shown on the screen. In this fashion, the sensor means 2 can be easily moved by a user into rough alignment relative to the measuring object 12 such that the measuring points 11 of the measuring object 12 are disposed within the measuring volume 16 in the two dimensions shown on the screen.

The optical sensor means 2 comprises two lasers 17 for determining the separation between the optical sensor means 2 and the measuring object 12 using laser beams 18 for controlling the measuring volume 16 in a third dimension, extending approximately perpendicular to the two dimensions shown on the screen. The laser beams 18 are disposed in a common plane and have a common point of intersection 19. The point of intersection 19 of the optical axes 15 of the sensors 13 must not necessarily coincide with the point of intersection 19 of the laser beams 18. The point of intersection 19 of the two laser beams 18 lies within the preferred measuring volume 16 of the sensor means 2. The user follows the images of the laser beams 18 on the measuring object 12. The separation between the images of the laser beams 18 changes in dependence on the separation between the sensor means 2 and the measuring object 12. When the sensor means 2 has an optimum distance from the measuring object 12, the two images of the laser beams 18 coincide and only one image is visible.

The user can therefore easily bring the sensor means 2 into a position relative to the measuring points 11 of the measuring object 12, such that the measuring points 11 are disposed in the measuring volume 16 of the optical sensor means 2. This guarantees exact determination of the positions of the measuring points 11 of the measuring object 12 relative to the reference system 4.

Figure 3:
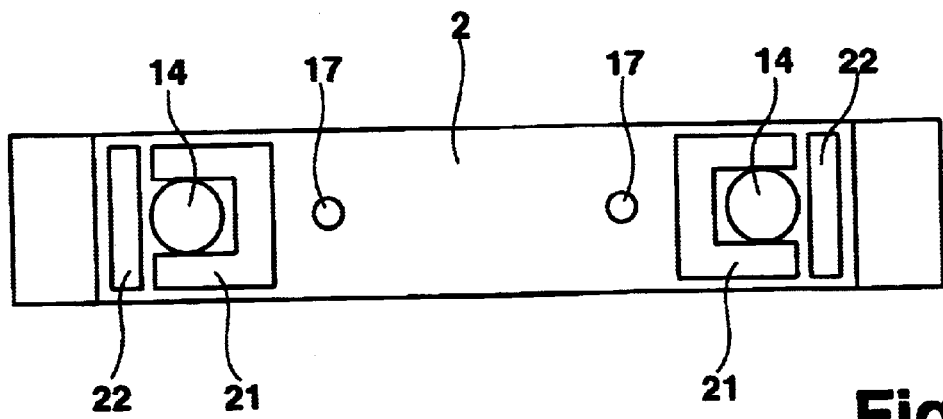
FIG. 3 shows a front view of the optical sensor means of FIG. 2.

FIG. 3 shows the optical sensor means 2 from the front. The illumination elements 21, 22 are clearly shown, surrounding the optical elements 14. The illumination elements comprise a C-shaped illumination element 21 and an I-shaped illumination element 22 for each optical element 14. The two illumination elements 21, 22 can be controlled independently of one another to precisely vary the light conditions in the measuring volume 16. The illumination elements 21, 22 emit light in the visible and invisible wavelength range. They can generate a continuous light distribution or be controlled in a flash-like manner.

The inventive device 1 permits determination of the position of measuring points 11 of a measuring object 12 comprising a flat surface not having abutment surfaces extending approximately upright to the planar surface, such as a glass ceramic cooker. Moreover, the device 1 can also be used for measuring objects 12 made from a non-rigid material, e.g. foamed material or rubber. The device 1 does not require each measuring point 11 of the measuring object 12 to be approached individually, rather several measuring points 11 can be recorded at nearly the same time. The travel paths of the sensor means 2 relative to the measuring points of the measuring object 12 which are required for position determination, can be reduced to a minimum. The sensor means 2 must only be moved such that the measuring points 11 are located in the measuring volume 16. The inventive device 1 can also be used by untrained staff, since one must not know which measuring points 11 of a measuring object 12 must be approached exactly in order to obtain sufficiently precise measurement of the measuring object 12.

Instead of the measuring arm 3 shown in FIG. 1, a robot arm can also be used as reference measuring means. In contrast to a measuring arm, a robot arm comprises actuators for motion thereof. The actuators are controlled by the processing means such that a user must not move the optical sensor means 2. The position of the sensor means 2 in three-dimensional space can be communicated to the processing means either by sensors (actual values) or by means of the motion data for the robot arm (set values). Through use of the proposed optical sensor means 2 in connection with a robot arm, position determination can be started directly after motion of the robot arm, i.e. while it is still vibrating. This is possible since the recording and processing of images is carried out sufficiently rapidly by the proposed sensor means 2 that vibration of the robot arm has no effect on the accuracy of the position determination.

We claim:

1. A device for position determination of measuring points of a measuring object, the device comprising:

a stationary support defining a reference system;

a measuring arm having a proximal end mounted to said stationary support and fixed with respect to said reference system;

reference measuring means for detecting, at a reference measuring frequency, a position of a distal end of said measuring arm relative to said reference system;

at least two image sensors mounted to said distal end of said measuring arm, said image sensors generating recorded images of the measuring object at a recording frequency for detecting positions of the measuring points relative to said image sensors and relative to said distal end of said measuring arm; and a processing means connected to said reference measuring means and connected to said image sensors for determining, at a processing frequency, positions of the measuring points relative to said reference system from said recorded images, wherein said processing frequency is greater than or equal to said recording frequency and said reference measuring frequency, for real time processing.

2. The device of claim 1, wherein said measuring arm is controlled by a user.

3. The device of claim 1, wherein said measuring arm comprises a robot arm.

4. The device of claim 1, wherein said image sensors are at least one of multiple image sensors and single image sensors.

5. The device of claim 4, wherein said image sensors comprise one of an electronic camera and a CCD camera.

6. The device of claim 5, further comprising at least one flashing light for illuminating the measuring points.

7. The device of claim 1, wherein said processing means determines, for each of said recorded images, positions of the measuring points of the measuring object and wherein said processing means comprises first means for filtering out best positions of the measuring points.

8. The device of claim 1, wherein said processing means comprises third means for determining a shape and a position of at least part of the measuring object relative to a position of said image sensors using positions of the measuring points.

9. The device of claim 8, wherein said third means of said processing means substantially simultaneously detect said shape and a said position of at least part of the measuring object relative to said position of said image sensors.

10. The device of claim 8, wherein each of said image sensors records at least two images, having two-dimensional information content, of at least part of the measuring object, wherein said processing means combines said two-dimensional images into at least one combined image having three-dimensional information content, and wherein said processing means evaluates said combined image to determine said shape and said position of the measuring object relative to said position of said image sensors.

11. The device of claim 7, wherein, after activation, the device permanently records images with said image sensors at said recording frequency and processes these in said processing means, wherein said processing means comprises fourth means to classify determined positions of the measuring points of the measuring object as valid or invalid, in dependence on whether said determined positions are within or outside of a predetermined measuring volume of the device.

12. The device of claim 11, further comprising signalling means to externally signal valid determination of positions of the measuring points of the measuring object.

13. The device of claim 11, wherein said processing means comprise a processing control for defining a predetermined sequence in which several measuring objects are to be measured, wherein, when a position determination of the measuring points of a measuring object to be measured has been terminated, said processing control automatically changes to a next measuring object.

14. The device of claim 1, further comprising at least one laser mounted to said distal end of said measuring arm for determining a separation between said image sensors and a surface of the measuring object via a laser beam.

15. The device of claim 14, wherein said laser radiates said laser beam onto said surface of the measuring object and further comprising an optical sensor for detecting said laser beam following reflection from said surface of the measuring object as well as means for measuring a travel time of said laser beam from said laser to said optical sensor and means for determining a separation between said image sensors and said surface of the measuring object from said travel time of said laser beam.

16. The device of claim 1, further comprising two lasers mounted to said distal end of said measuring arm for emitting two laser beams towards a surface of the measuring object, wherein said laser beams are disposed in a common plane and cross at a common point of intersection, located within a measuring volume of the device.

17. The device of claim 16, further comprising a planar sensor mounted to said distal end of said measuring arm for recording images of said two laser beams on said surface of the measuring object and with means for measuring a separation between said images of said laser beams and for determining a separation between said image sensors and said surface of the measuring object from said separation between said images of said laser beams.

18. The device of claim 17, wherein said the planar sensor comprises at least one of a single sensor and a multiple sensor.

* * * * *